US010518923B2

(12) United States Patent
Koenig

(10) Patent No.: US 10,518,923 B2
(45) Date of Patent: Dec. 31, 2019

(54) STRETCH-BLOW MOLDED PLASTIC CONTAINER AND STRETCH-BLOW-MOLDING METHOD

(71) Applicant: ALPLA WERKE ALWIN LEHNER GMBH & CO. KG, Hard (AT)

(72) Inventor: Helmut Koenig, Fussach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 14/769,371

(22) PCT Filed: Feb. 15, 2014

(86) PCT No.: PCT/EP2014/000422
§ 371 (c)(1),
(2) Date: Aug. 20, 2015

(87) PCT Pub. No.: WO2014/127901
PCT Pub. Date: Aug. 28, 2014

(65) Prior Publication Data
US 2016/0001913 A1   Jan. 7, 2016

(30) Foreign Application Priority Data

Feb. 22, 2013  (CH) ..................................... 0500/13

(51) Int. Cl.
*B65D 1/02*  (2006.01)
*B29C 49/00*  (2006.01)
(Continued)

(52) U.S. Cl.
CPC .......... *B65D 1/023* (2013.01); *B29C 49/0073* (2013.01); *B29C 49/56* (2013.01);
(Continued)

(58) Field of Classification Search
CPC .... B29C 49/0073; B65D 1/023; B65D 1/0207
(Continued)

(56) References Cited

U.S. PATENT DOCUMENTS 3,804,139 A  *  4/1974  Kimm .................... B65D 47/12
                                                        215/386
2004/0262321 A1   12/2004  Takeda
(Continued)

FOREIGN PATENT DOCUMENTS

EP   1 403 028 A1   3/2004
EP   1 488 911 A1   12/2004
(Continued)

OTHER PUBLICATIONS

International Search Report (PCT/ISA/210) dated May 19, 2014, by the European Patent Office as the International Searching Authority for International Application No. PCT/EP2014/000422.
(Continued)

*Primary Examiner* — Andrew T Kirsch
*Assistant Examiner* — Don M Anderson
(74) *Attorney, Agent, or Firm* — Buchanan Ingersoll & Rooney PC

(57) ABSTRACT

A stretch-blow molded plastic container includes a container body. A container neck, adjoins the container body via a shoulder region and has a container opening. The container body and the container neck are mutually separated by a support ring, which substantially radially protrudes, runs circumferentially in at least some regions and which has a support ring underside. The shoulder region has a first shoulder section, which runs in immediate proximity to the support ring underside, and a second shoulder support, which is integrally connected to the first shoulder support and which substantially radially adjoins the support ring. In a stretch-blow molding method a support ring of a preform, (Continued)

Figure 1:
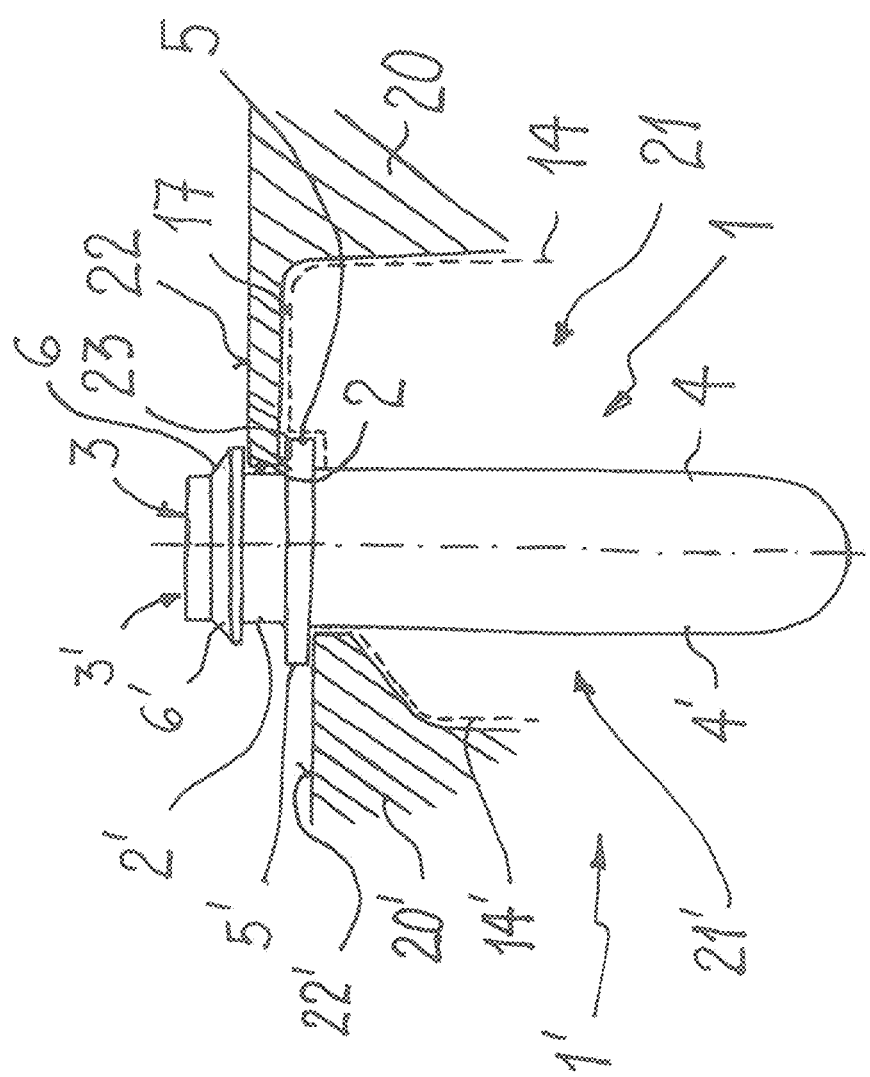

which is placed into a mold cavity of a blow molding tool, is overblown during radial and axial stretching of the preform.

20 Claims, 2 Drawing Sheets

(51) Int. Cl.
    *B29C 49/56*     (2006.01)
    *B29C 49/70*     (2006.01)
    *B29L 31/00*     (2006.01)
    *B29K 67/00*     (2006.01)
    *B29K 105/00*     (2006.01)
    *B29L 22/00*     (2006.01)

(52) U.S. Cl.
    CPC ............ *B29C 49/70* (2013.01); *B65D 1/0207* (2013.01); *B29C 2049/0089* (2013.01); *B29C 2049/566* (2013.01); *B29K 2067/003* (2013.01); *B29K 2105/258* (2013.01); *B29L 2022/00* (2013.01); *B29L 2031/7158* (2013.01)

(58) Field of Classification Search
    USPC ...................................................... 215/40, 42
    See application file for complete search history.

(56) References Cited

U.S. PATENT DOCUMENTS

2004/0262818 A1     12/2004    Takeuchi
2012/0118849 A1      5/2012    Harper

FOREIGN PATENT DOCUMENTS

FR        2 950 282 A1     3/2011
GB        2 131 344 A      6/1984

OTHER PUBLICATIONS

Written Opinion (PCT/ISA/237) dated May 19, 2014, by the European Patent Office as the International Searching Authority for International Application No. PCT/EP2014/000422.

* cited by examiner

STRETCH-BLOW MOLDED PLASTIC CONTAINER AND STRETCH-BLOW-MOLDING METHOD

The invention relates to a plastic container that is produced in a stretch-blow-molding method according to the preamble of Claim 1. The invention also relates to a stretch-blow-molding method for the production of such a plastic container according to the preamble of the independent method claim.

A large number of plastic bottles and similar plastic containers that are now used are produced in a stretch-blow-molding method. In this method, a so-called preform of a usually elongated, tube-like shape, which has a base on its one longitudinal end and a neck section on the other longitudinal end, is inserted heated into a mold cavity of a blow mold and inflated by a medium that is injected with overpressure. In this case, the preform is additionally elongated in the axial direction with an elongated mandrel that is run in through the neck opening. After the elongation/blow-molding process, the finished plastic container is demolded from the blow mold.

The preform is usually produced in a separate injection-molding method before the stretch-blow-molding process. The preforms can also be produced in an impact-extruding method or else by extrusion-blow molding. In the so-called single-stage stretch-blow-molding process, the preform is reshaped immediately after its production to form a plastic container with no cooling and storage in between. In most cases, however, the plastic containers are produced in a two-stage method, in which in a separate method, first the preforms are produced, cooled and intermediately stored for later use. The production of the plastic containers is carried out in a manner separated in space and time in a separate stretch-blow-molding process. In this later stretch-blow-molding process, the preforms are heated again in order to produce plastic bottles therefrom. For example, using infrared radiation, a desired temperature profile, which is necessary for the stretch-blow-molding process, is set for this purpose via the axial and/or radial extension of the preform. After the preform is inserted into the mold tool, the latter is radially and also axially formed by means of a gas that is injected with overpressure, and in this case is stretched in the axial direction with a bar. Then, the finished plastic container is demolded.

A large number of the known preforms have a support ring, which separates the elongated preform body from the neck section. The support ring usually has an outside diameter, which is at least 0.5 mm to 1 mm larger than the opening diameter of the neck section of the preform, and it is used for transport of the preform. After their production, the preforms are usually decanted randomly into large containers, such as, e.g., cartons, bags, mesh crates, octabins, etc., and transported. For further processing in the stretch-blow-molding method, the preforms are filled from the containers into a hopper upstream from a stretch-blow-molding device and separated. The preforms pass through the hopper in most cases onto an ascending conveyor, by means of which they are transported intermittently or continuously in small amounts to a roll sorter. In the roll sorter, the preforms are aligned corresponding to their center of gravity in such a way that they—suspended in a slot, with the preform body pointing downward—slip individually against the stretch-blow-molding device. The known preforms are held via the support ring or a comparable radial projection between the neck section and the preform body in the roll sorter. If the center of gravity of the preform clearly lies below the support ring or the radial projection in the area of the preform body, the preforms are correctly aligned and leave the roll sorter with the preform body pointing downward. The closer the center of gravity of the preform to the support ring or the radial projection, the greater the risk that such preforms may wind up in the wrong position. This can result in major problems in particular even in the case of preforms with a large opening diameter and long external threading as well as with a small, light preform body. In many cases, therefore, at the output of the roll sorter, systems are provided, with which the correct alignment of the preforms can be examined. Mis-aligned preforms are removed and fed again to the roll sorter. If the number of erroneously-aligned preforms is too large, however, most sorting systems collapse.

In the stretch-blow-molding device, the known preform is supported via the support ring on the mold tool, so that only the preform body projects into the mold cavity. The neck section that is located above the support ring is usually no longer changed during the stretch-blow-molding process.

On the finished stretch-blow-molded plastic container, the support ring has often proven to be disruptive, however, since it extends radially dominantly above the container neck and thus can greatly impair the degrees of freedom relative to the design of the plastic container and/or the closing caps for the plastic container. In contrast, however, there is also a desire to produce plastic containers, for example for personal-hygiene or cosmetic applications, which are usually to date inflated in an extrusion-blow-molding method from a continuously or intermittently extruded plastic hose, in a stretch-blow-molding method. The stretch-blow-molding method therefore makes possible an economical processing of polyethylene terephthalate (PET). Plastic containers produced from PET come closest optically and haptically to glass containers. The processing of PET in the stretch-blow-molding method makes possible the production of plastic containers with very small wall thicknesses, which always still have the necessary strengths, however, because of the stretch-solidification inherent to the material PET. The stretch-blow-molding method makes possible relatively high overall stretching ratios, which are defined as the product of the longitudinal stretching ratio and the radial stretching ratio. For PET, in this case overall stretching ratios of 8-14 have proven advantageous for the uniformity of the wall thickness distribution and for the strength of the plastic containers produced in the stretch-blow-molding method.

There is also often a desire for plastic containers, which have as long as possible a container body, but at the same time have a container neck with a relatively small opening diameter. To date, people have adapted in such cases by making the preform body that is located below the support ring correspondingly long. Because of the long preform body, the center of gravity of the preform is located below the support ring in the preform body, and enough material is available for the production of the plastic container in the stretch-blow-molding process. In contrast, the longer preform body can, however, result in the preform body being stretched inadequately in the longitudinal direction. Thus, the entire stretch-blow-molding process can be unstable, and as a result thereof, the achievable wall thicknesses in the container body can no longer be reproducible. In order to counteract this problem, preforms are also provided with small opening diameters with support rings, whose outside diameter is considerably larger than the opening diameter of the neck section of the preform. For example, the outside diameter of the support ring is around 2.5 mm to 24 mm larger than the opening diameter of the neck section. This makes it possible to design the preform body with a larger body diameter and at the same time to provide it with a smaller axial length, so that with the stretch-blow-molding method, a large enough longitudinal stretching ratio can again be achieved. Thus, it is ensured that the center of gravity of the preform is located below the support ring and that sufficient plastic material for the stretch-blow-molding process is available below the support ring.

On the finished stretch-blow-molded plastic container, the support ring that has a large outside diameter has in many cases proven to be disruptive. It extends radially dominantly above the container neck and thus can greatly impair the degrees of freedom relative to the design of the plastic container and/or the closing caps for the plastic container.

It is therefore the object of this invention to redress the problems depicted of the plastic container of the state of the art that is produced in the stretch-blow-molding method. A stretch-blow-molding method is to be modified in such a way that thus plastic containers can be produced, whose support rings do not hinder the mounting of closing caps or the like and allow the greatest possible freedom with respect to the container design. In this case, preforms are to be processable with support rings, which have sufficient plastic material in the preform body so that their center of gravity is arranged in the preform body. Plastic containers are to be producible that can have a long container body even in the case of small opening diameters of the container neck. In this case, the plastic container is to have a sufficiently large longitudinal stretching ratio and a reproducible wall thickness distribution. The support ring that separates the container neck from the container body is not to dominate the plastic container and is not to constitute any obstacle with respect to its design of the plastic container.

The achievement of these and still other objects consists in a stretch-blow-molded plastic container, in particular a plastic bottle, which has the features listed in Claim 1. A stretch-blow-molding method according to the invention for such a plastic container is distinguished by the method steps that are listed in the independent method claim. Further developments and/or advantageous variant embodiments of the invention are subjects of the respective dependent claims.

A stretch-blow-molded plastic container with a container body, which is closed with a container base, and with a container neck that adjoins the container body via a shoulder area, which neck has a container opening, is provided by the invention. The container body and the container neck are separated from one another by an essentially radially protruding support ring that is circumferential at least in places and that has a support ring bottom. The shoulder area has a first shoulder section that runs right next to the support ring bottom and a second shoulder section that is integrally bonded to the first shoulder section, which second shoulder section essentially radially adjoins the support ring.

A preform that essentially exhibits ambient temperature is heated in a heating furnace to a predetermined temperature. In this case, a heating profile can be imprinted over the axial extension of the preform body. Then, the preform is moved in a blow mold tool with a mold cavity, which has the shape of the plastic container that is to be produced. In the blow mold tool, the preform is stretch-blow molded to form a plastic bottle or a plastic container. From the state of the art, it is known that the bottom of the support ring rests on the blow mold tool and accordingly only the preform body projects into the mold cavity. To produce the proposed plastic container, however, the preform body is held above the support ring by the blow mold tool, so that the support ring also projects into the mold cavity. During the stretch-blow-molding process, a shoulder area is formed, which has a first shoulder section, which runs right next to the support ring bottom, and a second shoulder section that is integrally connected thereto, which second shoulder section essentially connects radially to the support ring. On account of the temperature of the preform in the neck area, the first shoulder section runs initially unchanged in its alignment in the direction of the container base and then extends radially essentially parallel to the support ring bottom, then merges in an upward step into the second shoulder section. The second shoulder section radially adjoins the peripheral edge of the support ring and extends along the mold cavity to the container body. The bending or deformation of the first shoulder area is carried out starting from its extension in the direction of the container base via the upward stage to the second shoulder section, which is radially further extended and adjoins an inside wall of the mold cavity. The forming of the first shoulder area is thus carried out in a manner that is not guided by tools or influenced by the cavity. On account of the temperature difference between the support ring and the material below the support ring, the formed first shoulder section is not firmly bonded to the support ring. The deformation of the first shoulder section is independent of the subsequent configuration of the bottle or the container, so that even bottles with an angled neck, so-called angle-neck bottles, can have a first shoulder section that is designed in such a way. In the case of angle-neck bottles, a first center axis of the container neck with the support ring and a second center axis of the container body encompass an acute angle.

In the case of the plastic container according to the invention, the support ring is overblown and can virtually form a unit with the shoulder area, so that the second shoulder section can radially adjoin the support ring. Otherwise, the support ring that protrudes dominantly from the container neck in the known plastic containers can thus form a component of the shoulder area of the plastic container. A section of the container neck that normally runs between the support ring and the container shoulder in the case of the containers of the state of the art is reshaped to form a first shoulder section and thus merges directly into the container shoulder. In this case, the first shoulder section forms an independent wall part and is not firmly bonded to the support ring bottom. It can be at a short distance from the support ring bottom or even directly adjoins the latter. An outside surface of the support ring that faces the edge of a mouth of the container can in this case be designed essentially flush with a top of the container shoulder. During the stretch-blow-molding process, in this case, a section of the preform body that adjoins the support ring is essentially stretched in such a way that it runs essentially corresponding to a contour of a bottom of the support ring and/or corresponding to an axial boundary area of the support ring. The material that is stretched from the preform body in the stretch-blow-molding process can surround the support ring at least on its bottom and its radial periphery without in this case being firmly bonded to the support ring. The axial extension of the container neck is in general limited by the support ring in such a plastic container.

Owing to the design of the plastic container according to the invention, the support ring no longer constitutes an obstacle to the mounting of a closing cap and/or a pour attachment. By the support ring being virtually integrated in the container body, its radial projection plays no role relative to the container neck. As a result, plastic containers can be produced that have a container neck with a very small diameter, but have a very long container body. Since the radial projection of the support ring on the finished stretch-blow-molded plastic container virtually no longer plays a role, preforms can be used for the production of such plastic containers, preforms that have a corresponding small-diameter preform neck but that are equipped with a support ring that has a very large radial projection. This makes it possible to connect a preform body whose length is the same as that of the usual preform body but which has a considerably larger outside diameter. Accordingly, much more plastic material is also contained in the preform body, which material is available for the subsequent axial and radial stretching process. As a result, optimal longitudinal stretching ratios and overall stretching ratios can also be achieved in plastic containers with small neck diameters and long container bodies.

Depending on the design of the mold cavity of the blow mold tool, the shoulder area can be a short radial distance from the support ring, so that the shoulder area at the transition from the support ring to the shoulder has a preferably circumferential groove. For this purpose, a preferably annular circumferential projection can be provided on the corresponding section of the blow mold. As an alternative, the shoulder area can adjoin the support ring essentially seamlessly. Essentially seamlessly is in this case defined as a transition in which a small step in terms of an axial distance from the support ring to the shoulder area is evident. In this case, the step can run in the direction of the edge of the mouth or in the direction of the container base. In another variant embodiment of the plastic container according to the invention, the support ring can be made integral with the shoulder area. In this case, a step is no longer evident at the transition from the top of the support ring to the outside wall of the container shoulder. In any case, the support ring and the shoulder section can also be distinguished by a different wall thickness and material density.

A variant of the stretch-blow-molded plastic container according to the invention can provide that the container neck has an axial extension, which is greater than or equal to 2 mm, measured from the support ring to the edge of a mouth surrounding the container opening. Such plastic containers with relatively short container necks are provided in particular for use in the field of personal hygiene and cosmetics, in which even more special closing caps and pour attachments are mounted on the container body and container neck.

On its container neck, the stretch-blow-molded plastic container suitably has at least one structure that is circumferential at least in places. This structure serves to secure the plastic container or a preform by friction, from which the plastic container is stretch-blow-molded, to a blow mold tool. In this case, the structure on the container neck or on the preform neck interacts with correspondingly designed holding means on the blow mold tool.

In a variant embodiment of the invention, the stretch-blow-molded plastic container has a structure on its container neck in the form of an essentially radially protruding projection. The radial projection serves to support the preform or the plastic container on a seating of the blow mold tool of a stretch-blow-molding device. On the finished stretch-blow-molded plastic container, the radial projection can serve to mount a closing cap or a pour attachment. The radially protruding projection suitably has a radial extension that is 0.5 mm to 15 mm. The radial projection can be provided along the axial extension of the container neck. In another variant embodiment, the radial projection can also be located in the area of the edge of the mouth of the container neck. Apart from a radial projection, the structure that is formed on the neck section can also have even more different shapes that can be formed depending on need and purpose as groove-like recesses or projections or threaded sections or bayonet closures, etc.

As materials for the stretch-blow-molded plastic containers, all materials that are suitable for the injection-blow-molding and stretch-blow-molding methods come into consideration. For example, these are PET, PET-G, HDPE, PP, PS, PVC, copolymers of the cited plastics, bioplastics, such as, for example, PEF, filled plastics, and mixtures of the above-mentioned plastics. The plastic or the plastic mixture can contain additives, catalysts, separating means and lubricating agents as well as dyes. Preferably, the preform is produced from PET in an injection-molding method or else in an impact-extruding method. In this connection, it is insignificant whether all components of the plastics or the plastic mixtures or only a portion of these components are obtained from renewable raw materials and the remaining portion of the components is obtained, for example, petrochemically.

In a variant embodiment of the invention, the stretch-blow-molded plastic container consists of polyethylene terephthalate. For achieving a wall thickness distribution in the container body that is as reproducible as possible, it has proven suitable when the plastic container has a longitudinal stretching ratio that is greater than or equal to 1.8 relative to a preform from which it is produced.

In another variant of the invention, the container body of the stretch-blow-molded plastic container has a non-circular cross-section. For example, the latter can be oval, elliptical or else polygonal, whereby the "corners" in each case are formed with a radius.

A stretch-blow-molding method for the production of a plastic container according to the invention is distinguished from the conventional stretch-blow-molding method in that a preform, which has an elongated preform body, one longitudinal end of which is closed with a preform base and a preform neck adjoins its other longitudinal end, whereby the preform body and the preform neck are separated from one another by an essentially radially protruding support ring, which is designed to be circumferential at least in places, is inserted into a mold cavity of a blow mold tool in such a way that the support ring is located inside the mold cavity. Then, the preform body is axially elongated by means of an elongated mandrel and axially and radially expanded by a gas that is injected with overpressure in such a way that a section that forms a shoulder area of the produced plastic container radially adjoins the support ring. The finished stretch-blow-molded plastic container is then demolded from the blow mold tool.

By the support ring of the preform forming a component of the container body of the plastic container that is stretch-blow molded therefrom, it otherwise loses its role that dominates and in many cases disrupts the design of the plastic container. As a result, the support ring no longer constitutes an obstacle to the mounting of a closing cap and/or pour attachment on the finished stretch-blow-molded plastic container. Preforms can be used that have a small-diameter preform neck, but are equipped with a support ring that has a very large radial projection. This makes it possible to connect a preform body whose length is the same as that of the usual preform body but which has a considerably larger outside diameter. Accordingly, much more plastic material is also contained in the preform body, which material is available for the subsequent axial and radial stretching process. In addition, it is ensured that the center of gravity of the preform lies in the preform body, so that the preform occupies a correct position in the case of its separation in the roll sorter. With preforms that are designed in such a way, plastic containers can also be produced that have a small neck diameter but a long container body, and in this case, optimal longitudinal stretching ratios and overall stretching ratios can be achieved.

A method variant can provide that the preform body is radially expanded during the stretch-blow-molding method in such a way that the support ring is formed integrally with the shoulder area.

In principle, the preform that is inserted into the blow mold tool could be secured by force-fitting or using holding means extending into its interior in the blow mold tool. The support ring, which is located in the interior of the mold cavity, is no longer available for the securing of the preform. For example, the preform could be held with its opening pointing downward on an elongated mandrel and could be inserted from below into the mold cavity of the blow mold tool. The preform is suitably held in the blow mold tool by form-locking, however.

In a variant embodiment of the stretch-blow-molding method according to the invention, the securing of the preform on the blow mold tool by form-locking is carried out with at least one structure that is circumferential at least in places on the container neck, which structure interacts with corresponding holding means on the blow mold tool. In a method variant, for example, the preform is held with a projection that protrudes essentially radially from the preform neck, which projection is supported on a corresponding seating of the blow mold tool.

The demolding and removal of the stretch-blow-molded plastic container from the mold cavity of the blow mold tool can be carried out, for example, using a vacuum device, a spreading gripper, or a pinching gripper. The vacuum device can operate, for example, on the edge of the mouth of the container neck. The spreading gripper is run in through the opening on the container neck and expanded. The pinching gripper engages on the outside wall of the container neck.

Figure 2:
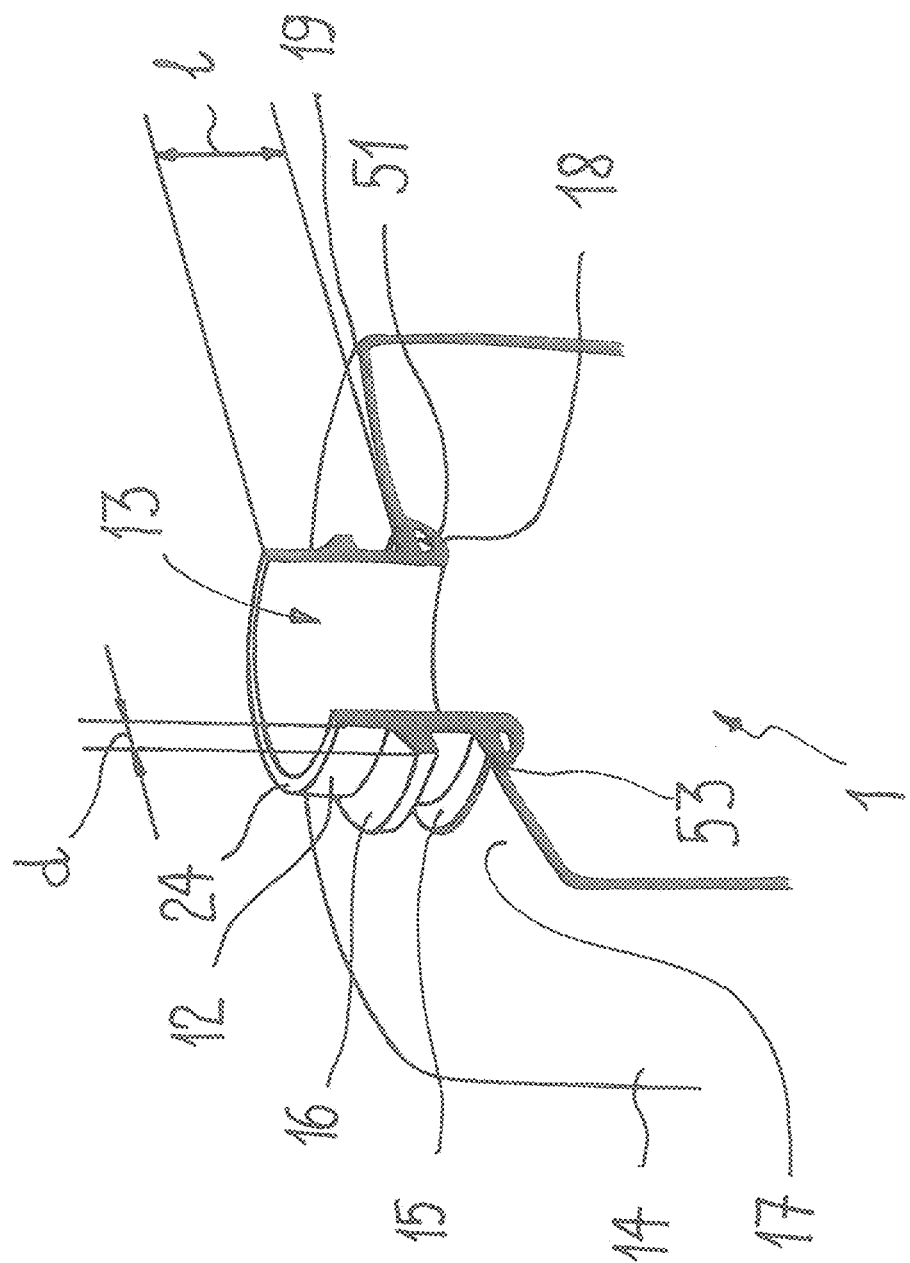

Further advantages and features follow from the subsequent description of an embodiment of the invention with reference to the diagrammatic drawings in a depiction that is not to scale:

FIG. 1 shows a preform that is inserted into a blow mold tool that is depicted in an axial cutaway for explaining the differences from the stretch-blow-molding method according to the invention to the method of the state of the art; and FIG. 2 shows a perspective view of a section, axially cut on the container side, of a plastic container that is produced according to the stretch-blow-molding method according to the invention.

The diagrammatic depiction in FIG. 1 serves to explain the differences from the stretch-blow-molding method that is modified according to the invention to a stretch-blow-molding method of the state of the art. In particular, FIG. 1 shows a preform that is inserted into a blow mold tool for this purpose. In this case, the left half of FIG. 1 shows the ratios during the stretch-blow-molding method of the state of the art, while in the right half of FIG. 1, the ratios during the stretch-blow-molding method according to the invention are depicted. The same components or elements in each case bear the same reference numbers, whereby for better differentiation, the reference numbers of the stretch-blow-molding method of the state of the art are provided in addition with an apostrophe "'."

The left half of FIG. 1 shows a preform 1', which is used for the stretch-blow-molding method of the state of the art in a mold cavity 21' of a blow mold tool 20'. The preform 1', which was previously produced, for example, in an injection-molding method or in an impact-extruding method, has an elongated preform body 4', one longitudinal end of which is designed closed. A preform neck 2', which has an opening 3', adjoins the other longitudinal end. The preform body 4' and the preform neck 2' are separated from one another by a so-called support ring 5'. The support ring 5' extends essentially radially and is designed in a circumferential manner at least in places. The preform 1' that is inserted into the mold cavity 21' of the blow mold tool 20', indicated in cutaway, is supported by its support ring 5' on a seating 22' of the blow mold tool 20', so that only the preform body 4' is arranged inside the mold cavity 21'. The support ring 5' itself is located outside of the mold cavity 21'. The preform neck 2' extends above the seating 22' of the blow mold tool 20' and is generally not further reshaped during the stretch-blow-molding method. The preform neck 2' can, as indicated, be provided with one or more structures. For example, this structure, as depicted, is designed as an essentially radially protruding, at least partially circumferential projection 6'. The structures can also be designed, however, as groove-like recesses, as threaded sections, or as a recessed or projecting contour of a bayonet closure, etc. In this case, multiple structures of different types can also be present in combination. Within the mold cavity 21', the outside contour of an inflated container body 14' is indicated in broken lines.

The right half of FIG. 1 shows the ratios in the stretch-blow-molding method according to the invention. A preform that is inserted into a mold cavity 21 of a blow mold tool 20 bears overall the reference number 1. The preform 1 has an elongated preform body 4, one longitudinal end of which is closed with a preform base. A preform neck 2, which has an opening 3, adjoins the other longitudinal end. The preform body 4 and the preform neck 2 are separated from one another by an essentially radially protruding, at least partially circumferential support ring 5. The preform 1 is supported by a projection 6, which protrudes essentially radially outward from the preform neck 2 and is designed at least partially circumferential, on a seating 22 of the blow mold tool 20. Unlike the condition with the stretch-blow-molding method of the state of the art, depicted in the left half of FIG. 1, the support ring 5 is located within the mold cavity 21 of the blow mold tool 20. For example, here, it adjoins an inner wall 23 of the blow mold tool 20 that limits the mold cavity 21. With subsequent axial and radial inflation of the preform body 4, the support ring 5 is overblown in such a way that a section that forms a container shoulder 17 adjoins the support ring 5. The container shoulder 17 and a container body 14 of the thus stretch-blow-molded plastic container are indicated in broken lines on the right half of FIG. 1. The preform neck 2 that protrudes from the mold cavity 21 and the projection 6 that radially protrudes therefrom are generally no longer changed with the stretch-blow-molding method and form a container neck.

After the axial stretching and radial inflation of the preform body 1 to form the plastic container, the latter is demolded. The demolding and the removal of the stretch-blow-molded plastic container from the blow mold tool 20 can be carried out, for example, using a vacuum device, a spreading gripper, or a pinching gripper. The vacuum device can operate, for example, on the edge of a mouth of the container neck or on a radially protruding projection 6. The spreading gripper is run in through the opening on the container neck and expanded. The pinching gripper engages on the outside wall of the container neck.

FIG. 2 shows a perspective view of a stretch-blow-molded plastic container 11 according to the invention that is depicted in axial cutaway looking toward the container neck 12 and the container opening 13. The container opening 13 is limited in axial direction by a mouth edge 24, which can serve as a sealing surface for a closure, not depicted here. The container shoulder 17 is formed from a first shoulder section 18 and a second shoulder section 19, which are bonded integrally with one another. The first shoulder section 18 adjoins a support ring bottom directly on the container neck 12. The first shoulder section 18 extends radially right next to the support bottom, but it is not firmly bonded to the latter. On a radial periphery 53 of the support ring 5, the first shoulder section 18 merges upward in a stepped manner into the second shoulder section 19. The second shoulder section 19 extends radially next to a radial periphery 53 of the support ring 5 up to the container body 14. Between the radial periphery 53 of the support ring 5 and the second shoulder section 19, a circumferential gap can be made. In an alternative embodiment, the second shoulder section 19 can directly adjoin the radial periphery 53 of the support ring 5, so that no gap is formed. In addition, the stepped rise of the first shoulder section 18 can be designed in such a way that a transition to the second shoulder section 19 extends axially above the support ring 5; i.e., it has a shorter axial distance from the edge of the mouth 24 than a top of the support ring 5.

In another alternative variant embodiment, the support ring 15 can merge smoothly into the container shoulder 17 or the latter is designed integrally with the container shoulder 17. The container body 14 adjoins the container shoulder 17. The container neck 12, which is essentially already preset by the preform neck, extends above the support ring 15. It has an axial length 1, which is greater than or equal to 2 mm, measured from the support ring 15 to an edge 24 of the mouth of the container opening 13. An essentially radial projection, which protrudes from the container neck 12, has a radial extension d, which can be 0.5 mm and more, and up to 15 mm. The radial projection 16 can, as depicted, be arranged between the support ring 15 and the edge of the mouth of the container opening 13. Depending on the design of the preform neck of the preform, from which the plastic container 11 is stretch-blow-molded, the container neck 12 can have structures designed in different ways. Instead of the radial projection 16 depicted in FIG. 2, these structures can also be designed as groovelike recesses, as threaded sections, as a recessed or projecting contour of a bayonet closure, etc. Also, several structures that are designed in different ways can also be present in combination.

In the case of the plastic container 11 according to the invention, the support ring 15 is overblown and virtually forms a unit with the shoulder area 17. The support ring 15 that otherwise protrudes dominantly from the container neck in the known plastic containers thus forms a component of the shoulder area 17 of the plastic container 11. As a result, the support ring 15 no longer constitutes an obstacle to the mounting of, for example, a closing cap and/or pour attachment. By the support ring 15 being virtually integrated into the container shoulder 17, its radial projection plays no role relative to the container neck 12. As a result, plastic containers 11 that have a container neck 12 with a very small diameter but have a very long container body 14 can be produced. Since the radial projection of the support ring 15 virtually no longer plays a role on the finished stretch-blow-molded plastic container 11, preforms that have a corresponding small-diameter preform neck but are equipped with a support ring that has a very large radial projection can be used for the production of such plastic containers. This makes it possible to connect a preform body whose length is the same as that of the usual preform body but which has a considerably larger outside diameter. Accordingly, much more plastic material is also contained in the preform body, which material is available for the subsequent axial and radial stretching process. As a result, optimal longitudinal stretching ratios and overall stretching ratios can also be achieved in plastic containers 11 with small neck diameters and long container bodies 14. In particular, in the process control, it is taken into account that the longitudinal stretching ratio is preferably greater than or equal to 1.8. The overall stretching ratio, which is defined as the product that consists of the longitudinal stretching ratio and the radial stretching ratio, suitably has a value of 8-14.

The invention claimed is:

1. A stretch-blow-molded plastic container comprising:
a container body, which is closed with a container base, and with a container neck that adjoins the container body via a container shoulder, which neck has a container opening;
a support ring visually separating the container body and the container neck and being made in one piece with the container body and the container neck, the support ring being an essentially radially protruding support ring that is circumferential at least in places and that has a support ring bottom that points in the direction of the container base, wherein the container shoulder has a first shoulder section that runs directly adjacent to the support ring bottom and a second shoulder section that is integrally bonded to the first shoulder section, which second shoulder section essentially radially adjoins the support ring, and wherein the second shoulder section extends radially outward from the first shoulder section and merges into the container body, and wherein the first shoulder section and the second shoulder section are manufactured as one piece and together constitute the container shoulder; and
wherein the support ring is made from a same material as a preform, from which the container is manufactured by stretch-blow molding, and wherein the support ring on the container is a remainder of the preform that has already been formed on the preform.

2. The stretch-blow-molded plastic container according to claim 1, wherein the first shoulder section comprising:
an essentially stepped outline and extends essentially radially parallel to the support ring adjacent the support ring bottom and merges in a stepped manner into the second shoulder section on a peripheral area of the support ring.

3. The stretch-blow-molded plastic container according to claim 1, wherein the first shoulder section adjoins the support ring bottom.

4. A stretch-blow-molded plastic container comprising:
a container body, which is closed with a container base, and with a container neck that adjoins the container body via a container shoulder, which neck has a container opening;
a support ring visually separating the container body and the container neck and being made in one piece with the container body and the container neck, the support ring being an essentially radially protruding support ring that is circumferential at least in places and that has a support ring bottom that points in the direction of the container base, wherein the container shoulder has a first shoulder section that runs directly adjacent to the support ring bottom and a second shoulder section that is integrally bonded to the first shoulder section, which second shoulder section essentially radially adjoins the support ring, and wherein the second shoulder section extends radially outward from the first shoulder section and merges into the container body, and wherein the first shoulder section and the second shoulder section are manufactured as one piece and together constitute the container shoulder; and wherein at a transition from the support ring to the second shoulder section, a step is formed at which the second shoulder section extends axially above the support ring.

5. The stretch-blow-molded plastic container according to claim 4, wherein the support ring is embedded in the container shoulder.

6. The stretch-blow-molded plastic container according to claim 1, wherein the second shoulder section is separated from the support ring at least in places.

7. The stretch-blow-molded plastic container according to claim 1, wherein the second shoulder section adjoins the support ring essentially seamlessly.

8. The stretch-blow-molded plastic container according to claim 1, wherein the container neck has an axial extension, which is greater than or equal to 2 mm, measured from the support ring to an edge of a mouth surrounding the container opening.

9. The stretch-blow-molded plastic container according to claim 1, wherein the container neck has at least one structure that is circumferential at least in places, via which structure the plastic container is configured to be secured to a blow mold tool.

10. The stretch-blow-molded plastic container according to claim 9, wherein the structure is an essentially radially protruding projection.

11. The stretch-blow-molded plastic container according to claim 10, wherein the radially protruding projection has a radial extension that is 0.5 mm to 15 mm.

12. The stretch-blow-molded plastic container according to claim 1, formed of polyethylene terephthalate and having a longitudinal stretching ratio that is greater than or equal to 1.8.

13. The stretch-blow-molded plastic container according to claim 1, wherein the container body has a non-circular cross-section.

14. A stretch-blow-molded method for production of a plastic container from a preform, which has an elongated preform body, one longitudinal end of which is closed with a preform base and which has a preform neck that adjoins its other longitudinal end, the preform body and the preform neck being separated from one another by an essentially radially protruding support ring, which is circumferential at least in places and has a support ring bottom, the support ring visually separating the container body and the container neck, the support ring being made in one piece with the container body and the container neck, and wherein the second shoulder section extends radially outward from the first shoulder section and merges into the container body, and wherein the first shoulder section and the second shoulder section are manufactured as one piece and together constitute the container shoulder, the method comprising:

inserting the preform into a mold cavity of a blow mold tool in such a way that the support ring is located inside the mold cavity;

elongating the preform body axially by an elongated mandrel, and axially and radially expanding the preform body by a gas that is injected with overpressure in such a way that a container shoulder of the produced plastic container is formed, which has a first shoulder section, which essentially adjoins the support ring bottom and is bonded integrally with a second shoulder section, which essentially radially adjoins the support ring, wherein the support ring is made from a same material as the preform, the support ring on the container being a remainder of the preform that has already been formed on the preform; and demolding and removing the finished stretch-blow-molded plastic container from the mold cavity of the blow mold tool.

15. The stretch-blow-molded method according to claim 14, wherein the preform body is radially expanded in such a way that the support ring is formed integrally with the second shoulder section.

16. The stretch-blow-molded method according to claim 14, wherein the preform that is inserted into the mold cavity of the blow mold tool is held by form-locking.

17. The stretch-blow-molded method according to claim 16, wherein the securing of the preform on the blow mold tool by form-locking is performed with at least one structure that is circumferential at least in places on the preform neck, which structure interacts with a corresponding form-locking device on the blow mold tool.

18. The stretch-blow-molded method according to claim 17, wherein the securing by form-locking is performed with a projection that protrudes essentially radially from the preform neck, which projection is supported on a corresponding seating of the blow mold tool.

19. The stretch-blow-molded method according to claim 14, wherein the demolding and removal of the stretch-blow-molded plastic container from the mold cavity of the blow mold tool is performed with a vacuum device, a spreading gripper, or a pinching gripper.

20. The stretch-blow-molded method according to claim 14, comprising:

a two-stage stretch-blow-molding in which a preform is manufactured in a separate production method, separated in time and/or space, is then reheated again to a predetermined extent, and then is stretch-blow molded in a stretch-blow-molding device to form a desired plastic container.

* * * * *